United States Patent
Clack

(10) Patent No.: US 8,136,510 B2
(45) Date of Patent: Mar. 20, 2012

(54) APPARATUS FOR IMPROVING EFFICIENCY AND EMISSIONS OF COMBUSTION

(75) Inventor: David M. Clack, Quenomo, KS (US)

(73) Assignee: Clack Technologies, LLC, Quenomo, KS (US)

( * ) Notice: Subject to any disclaimer, the term of this patent is extended or adjusted under 35 U.S.C. 154(b) by 402 days.

(21) Appl. No.: 12/352,815

(22) Filed: Jan. 13, 2009

(65) Prior Publication Data

US 2009/0120415 A1    May 14, 2009

Related U.S. Application Data

(63) Continuation-in-part of application No. 11/972,801, filed on Jan. 11, 2003, now Pat. No. 7,798,133, which is a continuation-in-part of application No. 11/182,546, filed on Jul. 15, 2005, now Pat. No. 7,341,049.

(51) Int. Cl.
*F02M 27/04* (2006.01)
(52) U.S. Cl. .................................................. 123/539
(58) Field of Classification Search ........... 123/536–539
See application file for complete search history.

(56) References Cited

U.S. PATENT DOCUMENTS

| | | | | |
|---|---|---|---|---|
| 1,873,746 | A * | 8/1932 | English | 123/539 |
| 4,308,844 | A * | 1/1982 | Persinger | 123/539 |
| 4,519,357 | A * | 5/1985 | McAllister | 123/539 |
| 5,010,869 | A * | 4/1991 | Lee | 123/539 |
| 7,341,049 | B2 * | 3/2008 | Clack | 123/539 |
| 2005/0126550 | A1 * | 6/2005 | Varasundharosoth et al. | 123/539 |
| 2006/0150614 | A1 | 7/2006 | Cummings | |
| 2009/0095266 | A1 * | 4/2009 | Burmenko | 123/537 |

* cited by examiner

*Primary Examiner* — N. McMahon
(74) *Attorney, Agent, or Firm* — Martin & Associates, LLC; Bret J. Petersen

(57) ABSTRACT

An apparatus improves the efficiency and emissions of a combustion process by producing sufficient amounts of ozone in the air flow to the combustion chamber to enable more complete and cleaner combustion of the fuel. A plurality of ozone elements for producing ozone are disposed within a housing that is placed in the air intake to a combustion chamber such as a diesel engine. The ozone elements are bonded together in a cross-shaped pattern inside the housing. The apparatus includes one or more vortex scrubbers or vanes in the housing to cause the air flow to have a vortex action to increase the amount of ozone that flows into the combustion chamber. The vortex scrubbers comprise multiple double fins that are attached inside the housing. The vortex scrubbers include holes and/or serrated edges to increase the disturbance of the air flow over the ozone elements to increase ozone production. The mass of the ozone elements have a preferred ratio.

13 Claims, 5 Drawing Sheets

APPARATUS FOR IMPROVING EFFICIENCY AND EMISSIONS OF COMBUSTION

CROSS-REFERENCE TO PARENT APPLICATIONS

This patent application is a continuation-in-part of U.S. Ser. No. 11/972,801, filed Jan. 11, 2008 now U.S. Pat. No. 7,798,133 which is a continuation-in-part of U.S. Ser. No. 11/182,546 filed Jul. 15, 2005 now U.S. Pat. No. 7,341,049 by the same inventor and having the same title, and which are incorporated herein by reference.

BACKGROUND

1. Technical Field

The disclosure and claims herein generally relates to combustion processes, and more specifically relates to an apparatus for improving the efficiency and emissions of a combustion process such as an internal combustion engine.

2. Background Art

It has been observed that automobiles run better after a thunderstorm. It is believed that this phenomenon is primarily caused by the natural conditions that exist after an electrical storm, namely, the presence of ozone and an increase in the relative amount of negative ions in the air. These conditions increase the efficiency of the internal combustion process by increasing the density of the air charge or the quantity of air supplied to the cylinder during a single cycle and increasing the ozone which contains more oxygen than diatomic oxygen. The combination of a denser air charge and more oxygen increases the cylinder pressure, which increases the engine torque and horsepower output. By increasing the engine's ability to do work, less fuel is used to perform the same work as an engine in a normal situation.

The conditions observed after a thunderstorm last for only a short period of time because the concentration of ozone following a thunderstorm is very small (about 1 part per billion (ppb)), and the relative imbalance of negative ions quickly reverts back to the usual positive/negative ion ratio at the earth's surface. For a short time after a thunderstorm, however, engines run more efficiently and use less gasoline.

Introduction of ozone into a combustion chamber like the conditions after a thunderstorm have been attempted to increase the efficiency of the combustion by increasing the amount of oxygen into the combustion for a given volume of air. Devices to add ozone gas and charged ions to a combustion chamber in an internal combustion engine have been described in the prior art. For example, in U.S. Pat. No. 1,982,484 issued to Runge, a distributor of an internal combustion engine is utilized to produce ozone gas which is then added to the combustion mixture flowing through an intake manifold of the engine. U.S. Pat. No. 4,308,844 to Persinger also describes improving the efficiency in an internal combustion engine by providing an ozone generator cell in the air supply to an engine. The ozone generator cell is a single tubular anode inside a tubular cathode that ionizes a relatively small volume of air to the engine.

FIG. 1 shows a prior art ozone generator used to enhance the efficiency of combustion. In FIG. 1, an ozone cell 110 is suitably disposed between the air intake 120 and a combustion chamber 130 to produce ozone and induce a charge in the air supply. In some prior art ozone generators, the ozone cell incorporates a single flat plate for the cathode and a single flat plate for the anode, and in others, the ozone cell is a single tubular anode and a single tubular cathode. The tubular cells were also shown to be placed with other tubular cells in series. An electric source is applied between the anode and cathode of the ozone cells. The electric source on the anode and cathode creates an electric field that splits oxygen molecules in the ambient air, leaving two single, highly active atoms of oxygen that combine with other oxygen to produce ozone ($O_3$). Ozone provides 50% more oxygen in its molecule, thereby providing faster and complete combustion, thereby providing more power to an engine.

While the foregoing devices to some extent may have accomplished their intended objectives, there is still a need to provide further improvement to the efficiency of an internal combustion engine. In particular, the prior art devices have not produced a sufficient volume of ozone ($O_3$) to be effective. Without a way to improve combustion, the industry will continue to suffer from inefficiency and poor engine performance.

BRIEF SUMMARY

An apparatus is described to improve efficiency and emissions of a combustion process by producing sufficient amounts of ozone in the air flow to the combustion chamber to enable more complete and cleaner combustion of the fuel. A plurality of ozone elements for producing ozone are disposed within a housing that is placed in the air intake to a combustion chamber such as a diesel engine. The ozone elements are bonded together in a cross-shaped pattern inside the housing. The apparatus includes one or more vortex scrubbers or vanes in the housing to cause the air flow to have a vortex action to increase the amount of ozone that flows into the combustion chamber. The vortex scrubbers comprise multiple double fins that are attached inside the housing. The vortex scrubbers include holes and/or serrated edges to increase the disturbance of the air flow over the ozone elements to increase ozone production. The mass of the ozone elements have a preferred ratio of about 0.24 to about 0.26.

The foregoing and other features and advantages of the invention will be apparent from the following more particular description and as illustrated in the accompanying drawings.

BRIEF DESCRIPTION OF DRAWINGS

The disclosure will be described in conjunction with the appended drawings, where like designations denote like elements, and.

DETAILED DESCRIPTION

The description and claims herein are directed to an apparatus to improve the efficiency and emissions of a combustion process by producing sufficient amounts of ozone in the air flow to the combustion chamber to provide more complete and cleaner combustion of the fuel. In a preferred implementation, a plurality of ozone elements are disposed within a housing that is in placed in the air intake to a combustion chamber such as a diesel engine. The cell elements create an electrical plasma field that produces ozone.

Figure 1:
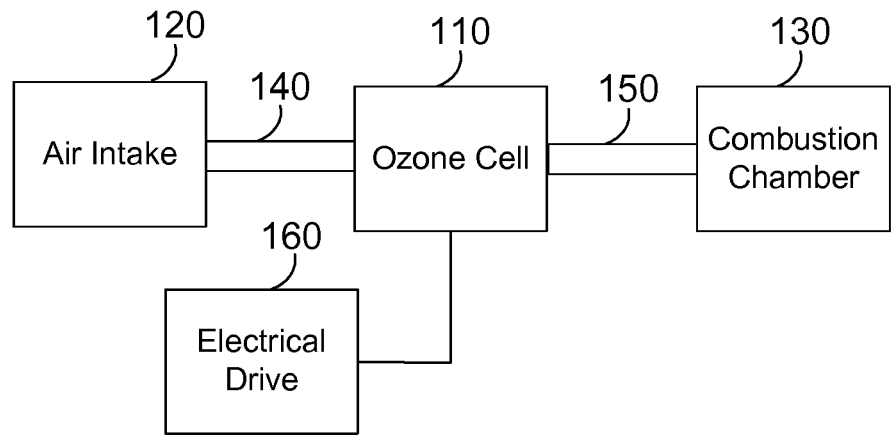
FIG. 1 is a block diagram of an apparatus in accordance with the prior art for providing ozone to a combustion chamber.
Figure 2:
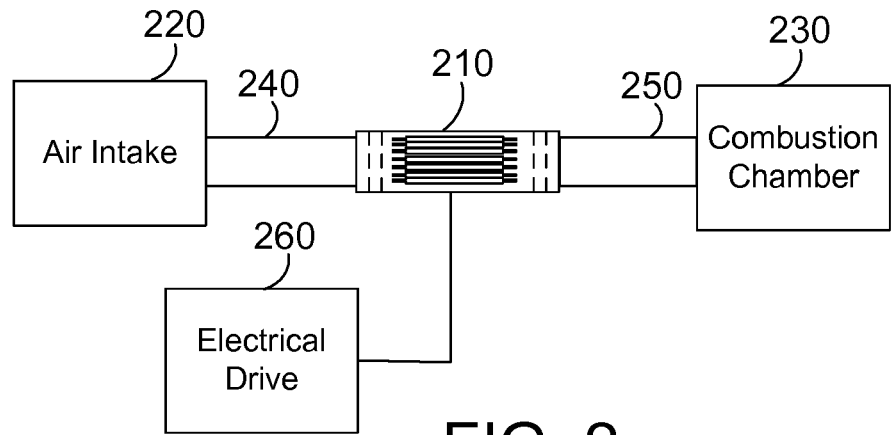
FIG. 2 is system view of an apparatus for providing ozone to a combustion chamber.

FIG. 2 shows an ozone cell 210 used to enhance the efficiency of combustion as described herein. The primary internal components are visible for illustration to match the description in FIG. 3. In FIG. 2, an ozone cell 210 is suitably disposed between an air intake 220 and a combustion chamber 230 to produce ozone and induce a charge in the air supply of a combustion process. Alternatively, the ozone cell is incorporated into the air intake pipe of an existing engine setup. The combustion process may be an internal combustion engine such as a diesel truck engine or a gasoline combustion engine such as used in automobiles. Alternatively, the combustion processes could also be combustion processes such as those used for electric power generation, furnaces, water heaters, or virtually any other combustion process.

Again referring to FIG. 2, the ozone cell 210 is connected in the supply line 240 from the air intake 220 and connected to the combustion chamber 230 with a supply line 250. The ozone cell can be mounted in any suitable configuration and could be located at a convenient position which allows the gaseous output to be transmitted to the combustion chamber 230 by a supply line 250. The ozone cell 210 is energized by an electrical drive circuit 260, which is described further below with reference to FIG. 4. The electrical drive circuit 260 creates an electrical field that creates a plasma field for producing ozone between and around the ozone elements described below.

Figure 3:
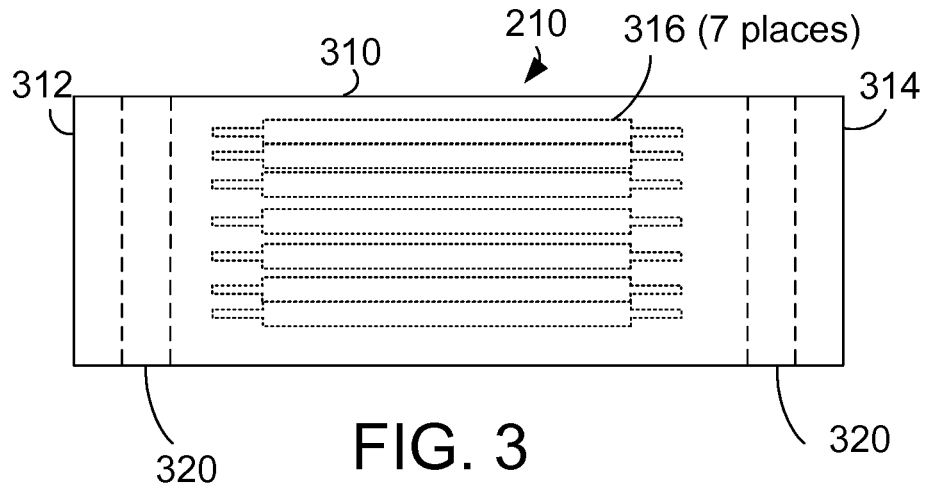
FIG. 3 is the ozone cell 210 shown in FIG. 2 for providing ozone to a combustion chamber.

FIG. 3 shows an external view of the ozone cell 210 with the primary internal components also visible in phantom. In this implementation, the ozone cell 210 includes a housing 310 that may comprise a conductive pipe such as stainless steel or a non-conductive pipe of PVC or similar material. The central housing 310 is preferably capable of carrying ozone gas and charged air without excessive deterioration. The housing 310 has in input end 312 and an output end 314. The housing 310 may be larger in diameter (not shown) than the supply lines 240, 250 (FIG. 2) so that the addition of ozone elements 316 will not significantly restrict air flow through the ozone cell 210. In one specific configuration, the ozone cell 210 includes an arrangement of multiple ozone elements 316 within the housing. The arrangement of the ozone elements within the housing is described further below in conjunction with FIG. 14. In the illustrated example, the ozone elements are cylindrical in shape and run parallel to the length of the housing. The overall length of the ozone elements can vary depending on the application. FIG. 3 further illustrates the location of vortex scrubbers 320 that provide air turbulence disposed in each end of the housing. Further detail of the vortex scrubbers is shown in FIGS. 5 through 8 and described in the related text below.

Figure 4:
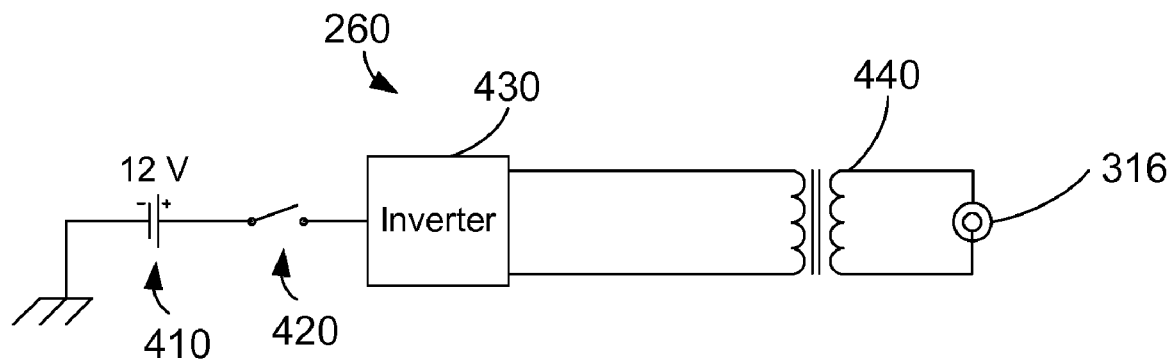
FIG. 4 is a schematic diagram of an electrical drive circuit.

FIG. 4 illustrates details of the electrical drive circuit 260 introduced in the discussion of FIG. 2. The electrical drive circuit 260 for the ozone cells includes a battery such as a standard rechargeable twelve volt lead-acid battery of the type usually associated with internal combustion engines. In automotive applications the battery can be the same as the one equipped on the vehicle since the current draw of the drive circuit 260 is minimal. The current from the battery 410 is connected through a switch 420 to an inverter 430 which converts the electrical output of the battery 1410 to an AC voltage. The output of the inverter 430 is connected to a transformer 440. A suitable transformer for use in connection with the present invention is described further below. The secondary winding of the transformer 440 is connected to the ozone elements 316 as described above. The secondary winding voltage is preferably from about 6,000 volts to about 12,000 volts AC. The most preferred is a voltage of about 7,000-8,500 volts AC. The preferred frequency is about 60 to 1000 Hz, with the most preferred frequency about 60 Hz. Preferably, the transformer is an oil filled, iron core transformer with copper wrap coils, that has the following electrical characteristics:

Input: 120 vac/60 hz
output: 7-8.5 kvac/27 ma
Max Pri Va 260
Max Pri Watts 125
Open Sec KvRMS 7-8.5
Short Sec Ma 27

Figure 5:
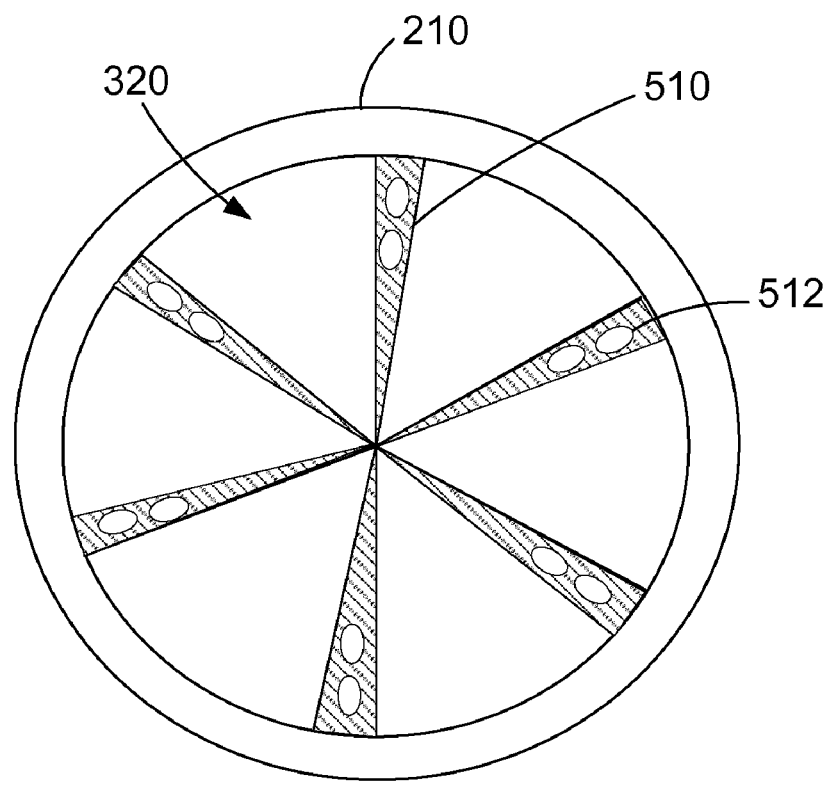
FIG. 5 is a vortex scrubber apparatus with holes for added air turbulence.

FIG. 5 illustrates a vortex scrubber 320 as viewed from the end of the ozone cell 210. In this example, the vortex scrubber 320 comprises six fins 510 equally spaced in the housing 310. The fins 510 are bent to have a propeller like shape to disturb the air flow and cause the air to have turbulence. A vortex scrubber 320 as shown in FIG. 5 is disposed from the center of the housing to the inner edges of the housing. A vortex scrubber may be placed on each end of the housing 310 (FIG. 3), with a first vortex scrubber in the intake end 312 of the housing 310 and the second in the output end 314 of the housing 310. Alternatively, the two vortex scrubbers may be on either end of the housing 210. The fins 510 alternatively include a pattern of holes 512 to increase the air turbulence. The air turbulence increases the exchange of fresh air at the surface of the ozone cell with the ozone containing air to increase the available ozone exiting the ozone cell 210 (FIG. 2).

Figure 6:
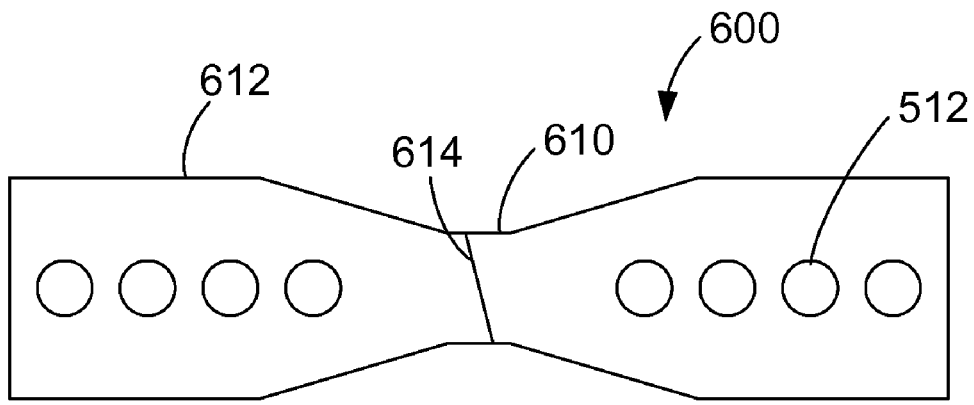
FIG. 6 is another vortex scrubber element.
Figure 7:
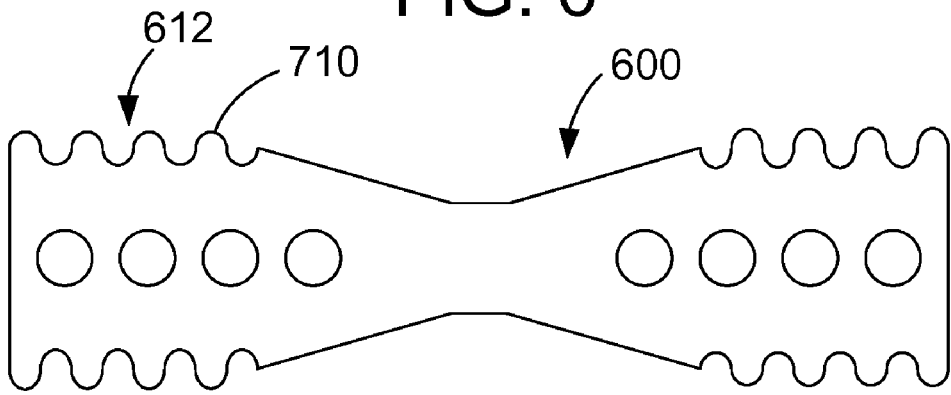
FIG. 7 is a vortex scrubber element with serrated edges.
Figure 8:
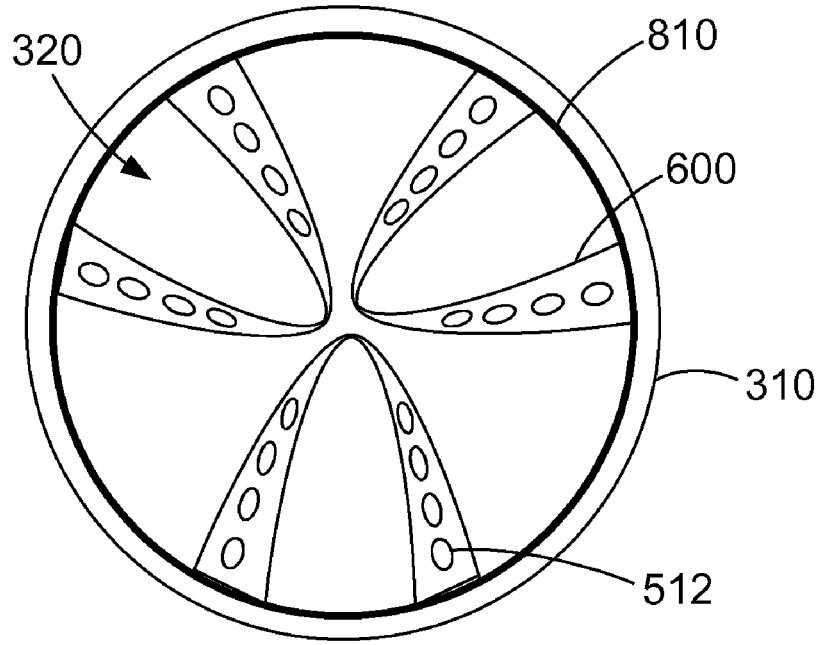
FIG. 8 is an end view of an ozone cell with vortex scrubbers installed as shown in FIG. 6.

FIGS. 6-8 illustrate another example of a vortex scrubber 320. In this example, the vortex scrubber comprises multiple double fins that are attached inside the housing. FIG. 6 illustrates a double fin 600 before it is bent into shape and placed in the vortex scrubber. The double fin 600 is preferably made of single piece of sheet metal that is shaped as shown in FIG. 6 and then bent as described below. The double fin 600 has a butterfly shape with a narrow portion 610 and a wider portion 612. The double fin 600 may have a pattern of holes 512 to increase air turbulence as described above. The edges of the wider portion 612 of the double fin may include a serrated edge 710 to increase air turbulence as shown in FIG. 7. The double fins 610 are bent to have a propeller like shape to disturb the air flow and cause the air to have turbulence. The double fins are preferably bent at the narrow portion 610 along the line 614 into a "V" like shape. Bending the double fin along the line 614 makes an offset in the two wider portions that creates a propeller like shape to the double fin. Several double fins bent into this shape are placed in the housing as shown in FIG. 8. In the example shown in FIG. 8, the ends of three vortex double fins are mounted to a ring 810 such that the bottom of the "V" shape is near the center of the ring. The ring 810 is then mounted in the housing as shown in FIG. 8 to create a vortex scrubber 320. Alternatively, the double fins could be mounted directly to the inner side of the housing. The double fins 600 in the vortex scrubber 320 may also incorporate the pattern of holes 512 and serrated edges (not shown) as described above.

Figure 9:
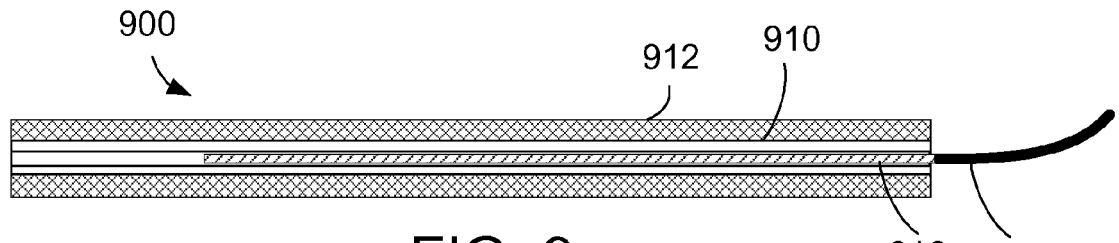
FIG. 9 is a cross-sectional front view of an example ozone element.

FIGS. 9-12 illustrate the different components of an ozone element 316 as introduced in FIG. 3. The ozone element 316 basically comprises two conductive electrodes separated by an insulator. FIG. 9 illustrates a cross-sectional view of a cylindrically shaped inner electrode 910 surrounded by a cylindrically shaped insulator 912. The inner electrode 910 may be a solid metal electrode, or it can be hollow, made of an open pipe as illustrated in FIG. 9. The inner electrode 910 accepts an electrical conductor 914 that is inserted into the center of the electrode 910. The end 916 of the electrical conductor extending into the inner electrode 910 is un-insulated, while the remaining portion of the electrical conductor may be insulated. The electrical conductor 914 is electrically and mechanically connected to the inner electrode 910 in a suitable manner, such as soldering or crimping the inner electrode. As shown in FIG. 9, the electrical conductor 914 may extend substantially through the electrode 912, but may extend a lesser amount. The inner electrode is preferably made of stainless steel pipe that is inserted in the insulator 912. The insulator is preferably a ceramic material such as glazed or unglazed porcelain. Other insulators could also be used such as polyethylene, PVC or other insulators as used in the prior art.

Figure 10:
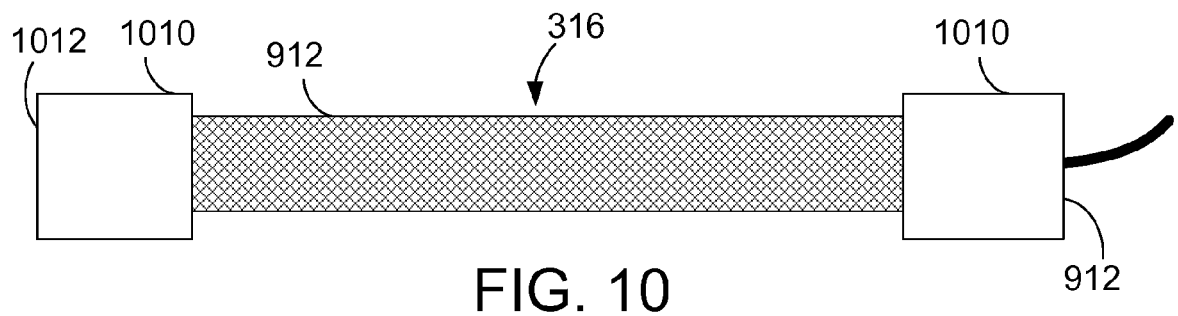
FIG. 10 is a front view of the ozone element shown in FIG. 9 with added insulation caps.

FIG. 10 illustrates a front view of the ozone element 316 introduced in FIG. 9. FIG. 10 illustrates the addition of insulator caps 1010 over the insulator 912. The insulator caps 1010 are disposed at the ends of the ozone element 316. The insulator caps 1010 cover a portion of each end of the ozone element 316 and may extend beyond the end of the ozone element. The insulator caps 1010 provide several functions. First, they prevent arching between the inner electrode 910 and the outer electrode (described below) at the ends of the ozone elements. Second, the insulator caps provide a structural element between the insulator 912 and outer electrode. And third, the insulator caps seal the ends of the outer electrode to prevent axial air flow between the outer electrode and the insulator 912. The ends 1012 of the insulator caps 1010 are sealed to cover the ozone element 316. The ends may be sealed in a suitable manner such as using a dielectric compound to fill the insulator caps, using a cup shaped insulator cap, or by using shrinkable tubing for the insulator caps.

Figure 11:
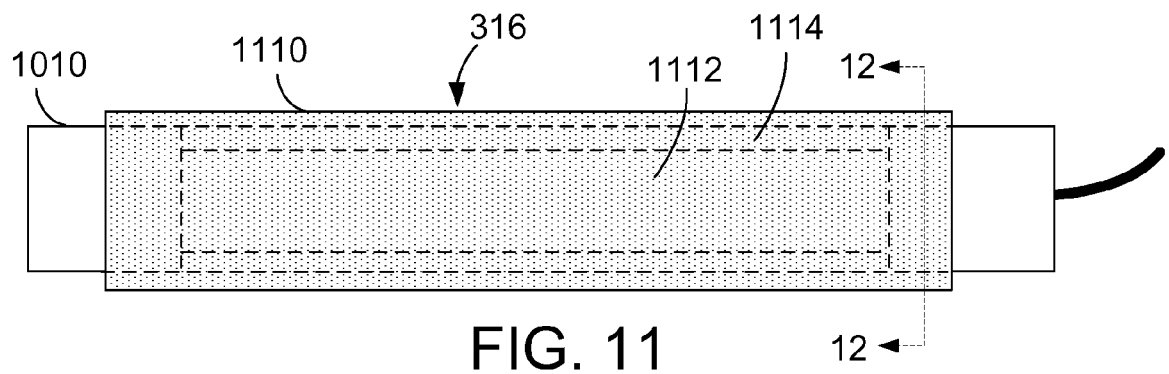
FIG. 11 is a front view of the ozone element shown in FIG. 10 with an outer electrode.

FIG. 11 illustrates a front view of the ozone element 316 introduced in FIG. 9 with the addition of a cylindrically shaped outer electrode 1110. The outer electrode 1110 fits over the insulator caps 1010 and may be held in place by a tight fit of the outer electrode pressed over the insulator caps 1610. The outer electrode 1110 is a conductive metal, and in this example is stainless steel. Further, the outer electrode is preferably perforated with a pattern of openings 1112 through the outer electrode. The openings provide an open space on the surface of the outer electrode of about 45 to 50 percent. The openings in the outer electrode expose a cavity or space 1114 between the outer electrode and the insulator 912 that is created by thickness of the insulator caps 1010 that provide spacing between the insulator and the outer electrode. While the space 1114 allows air to circulate between the outer electrode and the insulator, air does not flow axially through the space where the ends of the ozone element are sealed by the insulator caps 1010. Air movement in the space 1114 is a turbulent air flow through the openings 1112 in the outer electrode 1110 meaning only that air that enters through the openings 1110 exits through the openings 1110.

Figure 12:
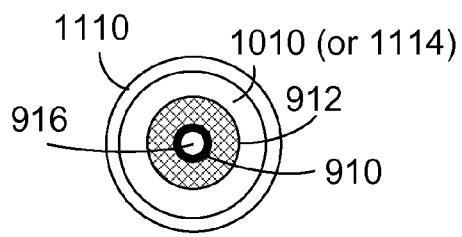
FIG. 12 is a cross-sectional end view of the ozone cell shown in FIG. 11.

FIG. 12 illustrates a cross-sectional view of an ozone element 316 shown in FIG. 11 taken along the line 12-12. The ozone element 316 includes the exposed end of an electrical conductor 916 connected to an inner electrode 910. The inner electrode 910 is surrounded by an insulator 912. The insulator 912 is surrounded on the ends by insulator caps 1010. Alternatively, if the cross section for this Figure were to be taken in the middle section, then the insulator 910 would be surrounded by space 1114. The insulator caps 1010 (or space 1114) are surrounded by the outer electrode 1110. The inner electrode 910 preferably has an outer diameter of about 0.148 inches to provide a close fit to slide the inner electrode 910 inside the insulator 912 that has an inner diameter of about 0.156 inches. The insulator 912 is preferably a ceramic porcelain tube with an outer diameter of 0.250 giving the insulator 912 a wall thickness of about 0.047 inches. The outer electrode 1110 is preferably has an inner diameter of about 0.375 inches and an outer diameter of about 0.437 inches. This makes the space 1114 about 0.0625 inches that is provided by the thickness of the insulator caps 1010 as described above. The length of the ozone elements 316 may vary depending on the application. In the illustrated example, the length is preferably about 11 inches.

The relative mass of the components comprising the ozone element 316 was found to be a factor in the performance of the ozone elements. In the illustrated embodiments, the mass of the different components of the ozone elements and the ratio of the component masses are preferably as shown in table 1 below. The mass ratio of the electrodes is the mass of the inner electrodes divided by the mass of the outer electrodes. The mass ratio of the electrodes only is the same regardless of the number of electrodes. Thus in the described example, the mass ratio of the electrodes is 8.5/34.6=0.25. The mass ratio for all the components of the electrodes includes the mass of the electrical conductors added with the inner electrodes and the mass of the bonding bars (described below) included with the outer electrodes. With 12 electrodes, the mass ratio for the total electrode components is calculated as shown in Table 1. The preferred mass ratio for the electrodes is about 0.24 to 0.26 and the preferred mass ratio for the electrode components is about 0.22 to about 0.25.

TABLE 1

Mass Ratios of Ozone Element Components

| | Single Electrode | Total of Components |
|---|---|---|
| Inner Electrode (grams) | 8.5 | Inner Electrodes + Electrical Conductors 12(8.5 + 0.5) = 108.0 |
| Outer Electrode (grams) | 34.6 | Outer Electrodes + Bonding Bars 12(34.6) + 2(24.4) = 464.0 |
| Mass Ratio | 0.25 | Total Mass Ratio 0.23 |

Figure 13:
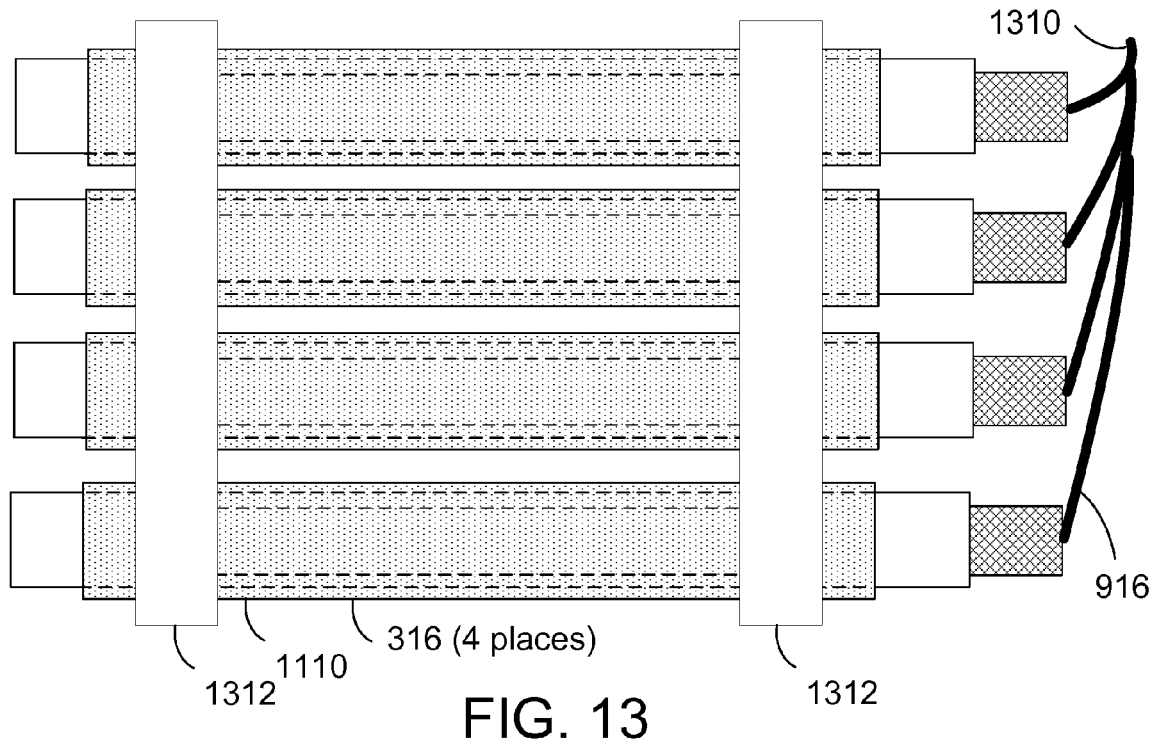
FIG. 13 is a view of four ozone elements that shows electrical bonding bars that connect the ozone elements.

FIG. 13 illustrates a front view of four ozone producing ozone elements 316 described above with reference to FIGS. 9 through 12. FIG. 13 shows that the electrical conductors 916 connected to the inner electrodes of the ozone elements 316 can be combined together to make an electrical connection 1310 to the electrical circuit described above. The electrical connection 1310 may be made inside the housing or outside the housing (not shown). FIG. 13 further shows bonding bars 1312 that electrically and mechanically connect the ozone elements 316. In FIG. 13, the bonding bars 1312 are shown to connect four ozone elements 316. In a similar manner, the bonding bars may connect a number of ozone elements arranged in an ozone cell as described herein. The bonding bars are preferably constructed of an electrically conductive metal that is welded, soldered or brazed to the outer electrodes 1110 of the ozone elements 316. An electrical connection to the bonding bars and to the outer electrodes may then be accomplished as described below with reference to FIG.

14. In this example, there are two bonding bars 1312 spaced along the ozone elements 316.

Figure 14:
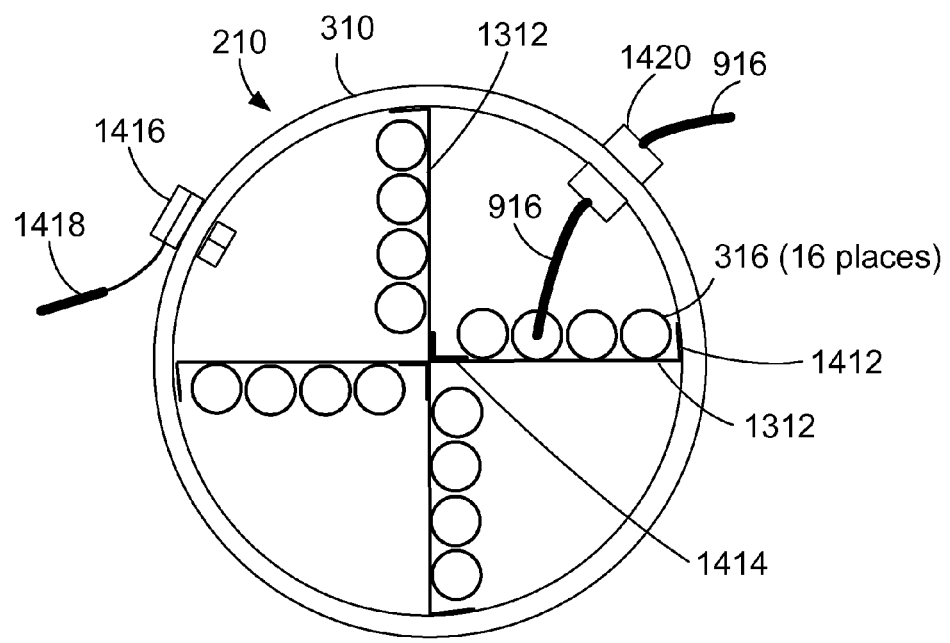
FIG. 14 is an end view of an open ozone cell having ozone elements as described in FIGS. 9 through 13.

FIG. 14 illustrates an end view of an open ozone cell 210 having ozone elements 316 as described in FIGS. 9 through 12. (The vortex scrubbers that would normally be visible inside the cell are not shown.) The ozone cell 210 has multiple ozone elements 316 arranged in a cross pattern inside the ozone cell housing 310. The ozone elements 316 in sets of four are bonded together as shown in FIG. 13. A set of 4 ozone elements is placed in each quadrant of the cell that is formed by the cross pattern. The bonding bars 1312 suspend the ozone elements 316 within the ozone cell 210. The bonding bars 1312 are preferably made of a sheet of metal formed into a cross pattern. The bonding bars 1312 are used to attached the ozone elements together in a spaced arrangement inside the ozone cell 210. The bonding bars 1312 preferably include means to attach the ozone elements into the housing 310. In the example illustrated in FIG. 14, the bonding bars 1312 include end tabs 1412 that connect to the ozone cell housing 310. The four sets of four ozone elements connected to the bonding bars in the illustrated example are attached into a single cross shaped unit. Two welding members 1414 are used to weld the ozone elements together as shown.

Again referring to FIG. 14, the ozone cell housing 310 in this example is a conductive metal housing. The bonding bars 1312 and the end tabs 1412 provide electrical connection between the outer electrode of the ozone elements 316 and the ozone cell housing 310. The ozone cell housing 310 is then connected to the electrical circuit described with reference to FIG. 14 through an electrical connection 1416. In this example, the electrical connection 1416 is a wire 1418 bolted to the ozone cell housing 310. The electrical connection 1414 may be through a chassis ground connection where the ozone cell housing is directly connected to chassis ground (now shown) instead of through a wire as shown. As described above, the inner electrodes of the ozone elements are also connected to the electrical circuit (described above). For simplicity, only a single electrical connection to the inner electrode of an ozone element is shown in FIG. 14. A conductive wire 916 connects to an ozone element 316 in the manner described above. The conductive wire 916 passes through the cell housing 310 through a grommet 1420 that seals and insulates the wire from the housing 310. The connections to the other ozone elements 316 are made in a similar manner and preferably are connected together (not shown) before passing outside the cell housing.

The disclosure and claims herein are directed to an apparatus that provides significant improvements over the prior art. An apparatus and method was described that increases combustion efficiency and performance and lowers emissions of virtually any combustion process. An ozone cell as described herein provides improved efficiency and performance and lower emissions in an internal combustion engine such as a diesel truck engine.

One skilled in the art will appreciate that many variations are possible within the scope of the claims. Thus, while the disclosure has been particularly shown and described above, it will be understood by those skilled in the art that these and other changes in form and details may be made therein without departing from the spirit and scope of the claims.

What is claimed is:

1. An apparatus for increasing the efficiency of combustion comprising:
   a housing adapted to be disposed between an air intake and a combustion chamber to supply air to the combustion chamber;
   a plurality of ozone elements arranged in the housing for creating ozone; and
   a vortex scrubber in the housing to produce a vortex motion of air moving through the housing, the vortex scrubber comprising a plurality of fins with a pattern of holes; and
   wherein the fins of the vortex scrubber comprises a plurality of double fins that are formed of a flexible sheet material bent into a "V" shape with a bend between two fin portions, where the bend gives an offset to the two fin portions to form a propeller shape to the double fins.

2. The apparatus of claim 1 wherein the plurality of double fins are attached to a ring placed inside the housing, where the plurality of double fins are attached to the ring such that a bottom of the "V" shape is near a center of the ring.

3. The apparatus of claim 1 further comprising a serrated edge on at least a portion of the plurality of double fins.

4. The apparatus of claim 1 wherein the combustion chamber is the cylinder of a diesel combustion engine.

5. The apparatus of claim 1 wherein the plurality of ozone elements comprise an inner electrode and an outer electrode and a mass ratio of an inner electrode and an outer electrode is about 0.25.

6. The apparatus of claim 1 wherein the plurality of ozone elements comprise a plurality of inner electrodes and a plurality of outer electrodes and a mass ratio from a mass of all components of the inner electrodes divided by a mass of all components making up the outer electrodes is about 0.23.

7. The apparatus of claim 1 wherein the plurality of ozone elements comprise a plurality of inner electrodes and a plurality of outer electrodes and a mass ratio from a mass of all components of the inner electrodes divided by a mass of all components making up the outer electrodes is about 0.22 to about 0.25.

8. The apparatus of claim 1 wherein the housing comprises a conductive metal pipe.

9. The apparatus of claim 1 wherein the ozone elements each comprise:
   a cylindrically shaped outer electrode of conductive material perforated with a pattern of holes;
   a cylindrically shaped inner electrode of conductive material disposed inside the outer electrode;
   a cylindrically shaped insulator between the inner and outer electrodes; and
   an insulating end cap between the insulator and outer electrode on each end of the insulator to form a space between the inner and outer electrode.

10. The apparatus of claim 9 wherein a mass ratio of the inner electrode and the outer electrode is about 0.25.

11. The apparatus of claim 9 wherein a mass ratio determined from a mass of the inner electrodes for each of the plurality of ozone elements divided by a mass of the outer electrodes for each of the plurality of ozone elements plus a mass of bonding bars is about 0.23.

12. The apparatus of claim 9 wherein a mass ratio determined from a mass of the inner electrodes for each of the plurality of ozone elements divided by a mass of the outer electrodes for each of the plurality of ozone elements plus a mass of bonding bars is about 0.22 to about 0.25.

13. The apparatus of claim 9 wherein the outer electrode has an outside diameter of about 0.437 and an inside diameter of about 0.375; the inner electrode has an outside diameter of about 0.148; and the insulator has in inside diameter of about 0.156 and an outside diameter of about 0.25 such that the space between the inner and outer electrode is about 0.0625 (all in inches).

* * * * *